United States Patent [19]

Dralle-Voss et al.

[11] Patent Number: 5,767,202
[45] Date of Patent: Jun. 16, 1998

[54] MODIFIED COPOLYMERS SUITABLE AS PARAFFIN DISPERSANTS, THEIR PREPARATION AND USE AND MINERAL OIL MIDDLE DISTILLATES CONTAINING THEM

[75] Inventors: Gabriele Dralle-Voss, Darmstadt; Knut Oppenländer, Ludwigshafen; Dieter Faul, Niederkirchen; Joachim Roser, Mannheim; Heinrich Hartmann, Limburgerhof; Bernd Wenderoth, Birkenau, all of Germany

[73] Assignee: BASF Aktiengesellschaft, Ludwigshafen, Germany

[21] Appl. No.: 702,441
[22] PCT Filed: Mar. 11, 1995
[86] PCT No.: PCT/EP95/00907
§ 371 Date: Dec. 2, 1996
§ 102(e) Date: Dec. 2, 1996
[87] PCT Pub. No.: WO95/25756
PCT Pub. Date: Sep. 28, 1995

[30] Foreign Application Priority Data

Mar. 24, 1994 [DE] Germany .............. 44 10 196.1

[51] Int. Cl.⁶ .......................................... C08F 8/32
[52] U.S. Cl. .................. 525/327.2; 505/379; 505/382
[58] Field of Search .................... 515/327.2, 379, 515/382

[56] References Cited

U.S. PATENT DOCUMENTS

| | | |
|---|---|---|
| 3,048,479 | 7/1962 | Ilnyckyj et al. |
| 3,627,838 | 12/1971 | Ilnyckyj et al. |
| 4,079,042 | 3/1978 | Topfl et al. |
| 5,100,969 | 3/1992 | Yamamoto et al. .......... 525/327.2 |

FOREIGN PATENT DOCUMENTS

| | | |
|---|---|---|
| 2 528 051 | 9/1983 | France |
| 2 342 300 | 4/1974 | Germany |
| 25 31 195 | 1/1976 | Germany |
| WO 90/12821 | 1/1990 | WIPO |

*Primary Examiner*—Bernard Lipman
*Attorney, Agent, or Firm*—Oblon, Spivak, McClelland, Maier & Neustadt, P.C.

[57] ABSTRACT

Modified copolymers which are suitable as paraffin dispersants and are obtainable by reacting a copolymer of an ethylenically unsaturated dicarboxylic acid and/or a dicarboxylic acid derivative and a diketene of the general formula I

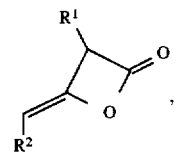

where $R^1$ and $R^2$, independently of one another, are each hydrogen or $C_1$–$C_{30}$-alkyl,
with an amine of the general formula II

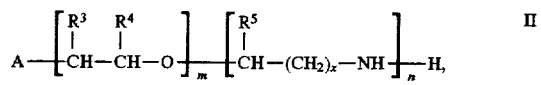

where
  m may be from 0 to 100, n from 0 to 5 and x from 0 to 5,
  $R^3$, $R^4$ and $R^5$, independently of one another, are each hydrogen or $C_1$–$C_5$-alkyl and
  A is $NR^6R^7$ or $C_2$–$C_{30}$-alkoxy,
  and at least one of the substituents $R^6$ or $R^7$ is not hydrogen and is $C_1$–$C_{30}$-alkyl or alkenyl or a polyether radical

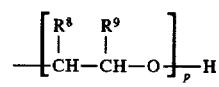

where $R^8$ and $R^9$ are each hydrogen or $C_1$–$C_5$-alkyl and p is from 1 to 100,
with the proviso that, when n is 0, A is $NR^6R^7$,
their preparation and use, and mineral oil middle distillates which contain these modified copolymers.

6 Claims, No Drawings

MODIFIED COPOLYMERS SUITABLE AS PARAFFIN DISPERSANTS, THEIR PREPARATION AND USE AND MINERAL OIL MIDDLE DISTILLATES CONTAINING THEM

BACKGROUND OF THE INVENTION

1. Field of the Invention

The present invention relates to modified copolymers suitable as paraffin dispersants, their preparation and use, and mineral oil middle distillates which contain these modified copolymers. The present invention relates in particular to modified copolymers obtainable by reacting certain copolymers with amines and based on a copolymer of an ethylenically unsaturated dicarboxylic acid and/or a dicarboxylic acid derivative and a diketene.

2. Discussion of the Background

Middle distillates, such as gas oils, diesel oils or heating oils, which are obtained by distillation of mineral oils, have different paraffin contents, depending on the origin of the crude oil. At lower temperatures, solid paraffins separate out (cloud point, CP). On further cooling, the lamellar n-paraffin crystals form a house-of-cards structure and the middle distillate sets although the predominant part of the middle distillate is still liquid. The flow of the power fuels obtained from mineral oil distillates is considerably adversely affected by the precipitated n-paraffins in the temperature range between cloud point and pour point. The paraffins block filters and cause irregular feed of the power fuel to the combustion units or completely stop said feed. Similar problems occur in the case of heating oils.

It has long been known that the crystal growth of the paraffins in the combustion fuels and power fuels obtained from mineral oil middle distillates can be modified by suitable additives. Effective additives prevent middle distillates from forming such house-of-cards structures and becoming solid at a few degrees centigrade below the temperature at which the first paraffin crystals form. Instead, fine, well crystallized, separate paraffin crystals are formed, which pass through filters in motor vehicles and heating systems or at least form a filtercake which is permeable to the liquid part of the middle distillates, so that trouble-free operation is ensured.

Ethylene/vinyl carboxylate copolymers, as disclosed in, for example, U.S. Pat. No. 3,048,479 and U.S. Pat. No. 3,627,838, have long been used as flow improvers.

A disadvantage of these additives is that the precipitated paraffin crystals have a higher density than the liquid part and therefore tend increasingly to separate out on the bottom of the container during storage. Consequently, a homogeneous phase having a low paraffin content forms in the upper part of the container and a two-phase paraffin-rich layer at the bottom. Since both in vehicle tanks and in storage or delivery tanks of mineral oil dealers the middle distillate is generally taken off slightly above the bottom of the container, there is a danger that the high concentration of solid paraffins will lead to blockages of filters and metering means. This danger is all the greater the further the storage temperature falls below the precipitation temperature of the paraffins, since the precipitated amount of paraffin increases with decreasing temperature.

The paraffin crystal modifiers, i.e. flow improvers or paraffin dispersants, are in general polymers which change the crystal growth of the n-paraffins by cocrystallization (interaction) and improve the flow properties of the middle distillate at low temperatures. According to DIN EN 116, the efficiency of the flow improvers is expressed indirectly by measurement of the cold filter plugging point (CFPP).

DE-A-2 342 300 discloses copolymers of maleic anhydride (MA) and diketenes. These copolymers or the completely or partially hydrolyzed form thereof are described as being suitable products for the preparation of surfactant compounds, hairspray compositions, glass cleaners, textile assistants or binders for strengthening nonwovens and paper.

DE-A-2 531 195 describes reaction products of MA/diketene copolymers or MA/diketene/vinyl ether terpolymers with alcohols of 1 to 18 carbon atoms, polyethylene glycol monoalkyl ethers and mixtures of the two. These are used in particular in textile assistants and hair cosmetics.

SUMMARY OF THE INVENTION

It is an object of the present invention to provide copolymers which ensure the flow of mineral oil middle distillates at low temperature and which have a dispersing effect such that settling out of precipitated paraffins is delayed or prevented. The flow improvers should display their activity regardless of the composition of the mineral oil middle distillates.

We have found that this object is achieved by modified copolymers which are obtainable by reacting a copolymer of an ethylenically unsaturated dicarboxylic acid and/or a dicarboxylic acid derivative and a diketene of the general formula I

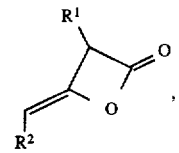

where $R^1$ and $R^2$, independently of one another, are each hydrogen or $C_1$-$C_{30}$-alkyl, the presence of a monoethylenically unsaturated $C_3$–$C_8$-monocarboxylic acid as a comonomer being excluded, with an amine of the formula II

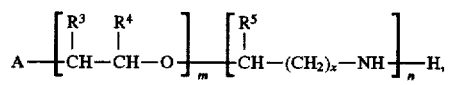

where m may be from 0 to 100, n from 0 to 5 and x from 0 to 5, $R^3$, $R^4$ and $R^5$, independently of one another, are each hydrogen or $C_1$-$C_5$-alkyl and A is $NR^6R^7$ or $C_2$-$C_{30}$-alkoxy, and at least one of the substituents $R^6$ or $R^7$ is not hydrogen and is $C_1$—$C_{30}$—alkyl or alkenyl or a polyether radical

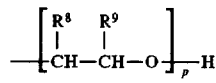

where $R^8$ and $R^9$ are each hydrogen or $C_1$-$C_5$-alkyl and p is from 1 to 100, with the proviso that, when n is 0, A is $NR^6R^7$.

The present invention moreover relates to a process for the preparation of modified copolymers, which are suitable as paraffin dispersants, by reacting a copolymer of an ethylenically unsaturated dicarboxylic acid and/or a dicarboxylic acid derivative and a diketene of the general formula I

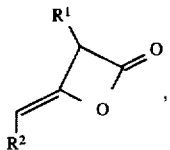

where $R^1$ and $R^2$, independently of one another, are each hydrogen or $C_1-C_{30}$-alkyl, with an amine of the general formula II

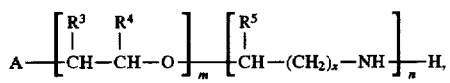

where m may be from 0 to 100, n from 0 to 5 and x from 0 to 5, $R^3$, $R^4$ and $R^5$, independently of one another, are each hydrogen or $C_1-C_5$-alkyl and A is $NR^6R^7$ or $C_2-C_{30}$—alkoxy, and at least one of the substituents $R^6$ or $R^7$ is not hydrogen and is $C_1-C_{30}$-alkyl or alkenyl or a polyether radical

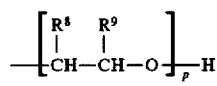

where $R^8$ and $R^9$ are each hydrogen or $C_1-C_5$-alkyl and p is from 1 to 100, with the proviso that, when n is 0, A is $NR^6R^7$.

DETAILED DESCRIPTION OF THE PREFERRED EMBODIMENTS

The novel modified copolymers consist of at least two different monomers, ie. a diketene of the general formula I and an ethylenically unsaturated dicarboxylic acid and/or a dicarboxylic acid derivative. These are generally present as an alternating sequence in the copolymer strands.

The diketenes of the formula I are known per se. The unsubstituted diketene is an important starting material for the preparation of acetoacetic acid derivatives.

An example of a substituted diketene is the distearyldiketene in which $R^1$ and $R^2$ are each of 14 to 16 carbon atoms, sold under the name Basoplast® by BASF Aktiengesellschaft.

According to the invention, the unsubstituted diketene (in which $R^1$ and $R^2$ are each hydrogen) is preferably used.

According to the invention, suitable ethylenically unsaturated dicarboxylic acids or dicarboxylic acid derivatives are, for example, fumaric acid, maleic acid, itaconic acid, mesaconic acid, citraconic acid, methylenemalonic acid, esters thereof and, if required, anhydrides.

According to the invention, α,β-unsaturated dicarboxylic acids or dicarboxylic acid derivatives of the general formula III

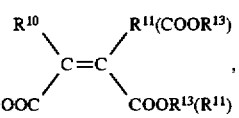

where $R^{10}$ to $R^{13}$, independently of one another, are each hydrogen or a $C_{1-20}$-alkyl radical which may contain hetero atoms and $R^{10}$ and $R^{11}$ are in particular each hydrogen, or the anhydrides of the corresponding cis-dicarboxylic acids are preferably used. Maleic acid, maleic anhydride and fumaric esters are very particularly preferred.

The copolymers used according to the invention may in addition contain further monomers. Examples of suitable comonomers are α-olefins, polymeric ethylene, propene, butene and isobutene derivatives having unsaturated terminal groups, aryl-substituted olefins (e.g. styrene), vinyl ethers and vinyl esters.

Preferred modified copolymers are derived from copolymers which consist of maleic anhydride and the unsubstituted diketene.

The polymerization of ethylenically unsaturated dicarboxylic acids or dicarboxylic acid derivatives and diketenes of the formula I is carried out in general in a manner known per se, in an inert organic solvent under free radical conditions (cf. DE-A-2 342 300 or DE-A-2 531 195). Solvents which virtually do not intervene at all in the polymerization and do not react with the monomers are particularly suitable. Such solvents, which may be used alone or as a mixture, are, for example, acetone, methyl ethyl ketone, diethyl ketone, cyclohexanone, tetrahydrofuran, dioxane, ethyl acetate, ethyl propionate, aromatic hydrocarbons, such as benzene, toluene, xylene, cumene, tetralin or solvent naphtha (e.g. Solvesso® 150), aliphatic hydrocarbons, such as pentane, hexane, heptane, octane, isooctane, cyclohexane, decalin or Shellsol® D70, and aliphatic halohydrocarbons, such as dichloromethane, dichloroethane or trichloroethane.

Solvesso® 150 from EXXON Chemical GmbH is an aromatic solvent fraction which has a boiling range of 187°–203° C. and contains about 99% of aromatics.

Shellsol® D70 from Shell Chemical is an aliphatic solvent fraction having a boiling range of 195°–245° C.

Acetone, methyl ethyl ketone, toluene, xylene, tetralin, decalin, solvent naphtha or Shellsol® D70 is preferably used as the solvent.

The polymerization of ethylenically unsaturated dicarboxylic acids or dicarboxylic acid derivatives, diketenes and, if required, further ethylenically unsaturated monomers is carried out, as a rule, in the presence of compounds which decompose into free radicals under the polymerization conditions. Examples of suitable polymerization initiators are hydrogen peroxide, organic peroxides and hydroperoxides, azo compounds and peroxodisulfates. The polymerization may also be carried out by the action of high-energy radiation or by irradiating the reaction mixture in the presence of a photoinitiator, for example benzoin.

The initiators should preferably have a half-life of <3 hours at the chosen polymerization temperatures. Preferably used polymerization initiators are tert-butyl perpivalate, dilauryl peroxide, tert-butyl per-2-ethylhexanoate (tert-butyl peroctoate), tert-butyl perbenzoate, dicumyl peroxide, di-tert-butyl peroxide and 2,2'-azobis(2-methylpropionitrile), alone or as a mixture.

The polymerization initiators which decompose into free radicals are used here in conventional amounts, for example from 0.1 to 5% by weight, based on the amounts of monomers used in the polymerization. The polymerization is preferably carried out in stirred kettles which are equipped, for example, with an anchor stirrer, paddle stirrer or impeller stirrer. The polymerization can be carried out, for example, as a solution, precipitation or suspension polymerization. In the case of the precipitation and suspension polymerization, it may be advantageous to effect polymerization additionally in the presence of protective colloids. Examples of suitable protective colloids are copolymers of maleic anhydride and vinyl alkyl ethers which contain from 1 to 20 carbon atoms in the alkyl group, or copolymers of maleic anhydride and olefins of 8 to 20 carbon atoms and monoesters thereof with $C_{10}$–$C_{20}$-alcohols or monoamides with $C_{10}$–$C_{20}$-amines. Polyalkyl vinyl ethers whose alkyl group is of 1 to 20 carbon atoms are also suitable, for example polymethyl, polyethyl and polyisobutyl vinyl ether. If a protective colloid is used in the copolymerization, the effective amounts are in general from 0.05 to 4.0% by weight, based on the monomers to be polymerized.

The concentration of the monomers in the solutions is in general from 5 to 80, preferably from 15 to 60, % by weight. The polymerization temperature is, as a rule, from 40° to 160° C., preferably from 50° to 150° C.

After the end of the polymerization, the polymers may be isolated, for example by distilling off the solvent used in the polymerization or by precipitating the polymers using a suitable solvent. The copolymers then remain as a pulverulent residue.

The novel reaction of these copolymers with the amines of the formula II can, however, also be carried out in the same solvent without prior isolation of the copolymers.

The weight average molecular weight of the copolymers is in general from 200 to 50,000, preferably from 400 to 10,000. In view of their use for the preparation of flow improvers (paraffin dispersants), those having an average molecular weight of from 500 to 5000 are preferred. The molecular weight is determined here by means of gel permeation chromatography.

The novel modified copolymers are obtainable by reacting these copolymers with an amine of the general formula II

where m may be from 0 to 100, n from 0 to 5 and x from 0 to 5, $R^3$, $R^4$ and $R^5$, independently of one another, are each hydrogen or $C_1$–$C_5$-alkyl and A is $NR^6R^7$ or $C_2$–$C_{30}$-alkoxy, and at least one of the substituents $R^6$ or $R^7$ is not hydrogen and is $C_1$—$C_{30}$—alkyl or alkenyl or a polyether radical

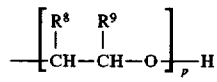

where $R^8$ and $R^9$ are each hydrogen or $C_1$–$C_5$-alkyl and p is from 1 to 100, with the proviso that, when n is 0, A is $NR^6R^7$.

The $C_1$–$C_{30}$-alkyl or alkenyl radical forming $R^6$ and/or $R^7$ is preferably a $C_3$–$C_{30}$-and particularly preferably a $C_{12}$–$C_{24}$-alkyl or alkenyl radical which may be polyunsaturated and, if required, branched.

In a preferred embodiment of the invention, m or n is 0.

Examples of amines of the formula II where m is 0 are distearylamine, di-tallow fatty amine, dioleylamine, di-coconut fatty amine, aminopropylstearylamine, aminopropyllaurylamine, aminopropyloleylamine and 2-ethylhexylamine.

Examples of amines of the formula II where n is 0 are the alkoxylation products of distearylamine, oleylamine, di-tallow fatty amine, hydrogenated tallow fatty amine, di-coconut fatty amine and aminopropylstearylamine. Where n is 0, m is preferably from 1 to 10. Alkoxylated stearylamine and alkoxylated distearylamine, e.g. hydroxyethyldistearylamine and polyoxypropylene(5)-stearylamine, are particularly preferred.

Examples of further amines to be used according to the invention are aminopropylstearyl alcohol, aminopropylethoxystearylamine and stearylpolyethyleneglycolamine (aminated Lutensol® AT11 from BASF Aktiengesellschaft).

In the novel process, the copolymer of an ethylenically unsaturated dicarboxylic acid or dicarboxylic acid derivative and a diketene of the general formula I is heated with an amine of the general formula II in the presence or absence of a solvent, as a rule for from 0.3 to hours, to 80°–180° C. Any solvents used advantageously have no acidic hydrogen atoms which could react with the copolymers. The solvents used may be the same as those in the polymerization. Aromatic hydrocarbons, e.g. toluene, xylene or solvent naphtha (e.g. Solvesso® 150), or aliphatic hydrocarbons, e.g. cyclohexane, decalin or Shellsol® D70, are preferably used.

If required, the reaction may be accelerated by means of acidic or basic catalysts, e.g. p-toluenesulfonic acid, sodium methylate, sulfuric acid, phosphorous acid, citric acid, potassium tert-butylate or tetrabutyl orthotitanate. If condensation water is formed in the reaction, it is distilled off continuously. The reaction need not go to completion. The amide or ester bonds formed during the reaction and the decrease in the concentration of the lactone having a 4-membered ring can be detected by IR spectroscopy. A decrease in the acid number [mg KOH/g] is simultaneously observed. The acid number is preferably less than 160 mg KOH/g.

The amine of the formula II is used in general in an amount of from 0.2 to 3, preferably from 0.5 to 1.5, mol per mole of polymerized dicarboxylic acid (derivative) unit.

The novel modified copolymers are used as additives for mineral oil middle distillates, which are understood as meaning petroleum, heating oil and diesel fuels having a boiling point of from about 150° to 400° C. The copolymers may be added to the middle distillates directly but are preferably added in the form of a 20–70% strength by weight solution. Suitable solvents are aliphatic or aromatic solvents, such as xylene or mixtures thereof, as well as high-boiling mixtures of aromatics, and middle distillates. The amount of copolymers in the mineral oil middle distillates is as a rule from to 10 to 10 000 preferably from 20 to 5000, particularly preferably from 50 to 1000, ppm. Depending on the intended use, the middle distillates may also contain further additives, such as flow improvers, dispersants, antifoams, corrosion inhibitors, antioxidants, demulsifiers, lubricity improvers, conductivity improvers and/or dyes.

Such middle distillates usually already contain conventional flow improvers which are described in detail in the patent literature, for example in DE-A-19 14 756 and EP-A-486836 (ethylene/vinyl ester copolymers and mixtures thereof with other copolymers), EP-A-214876 (α-olefin/maleic anhydride) or EP-A-155 807 (alkyl fumarate/vinyl acetate copolymers).

However, terpolymers which contain further comonomers in addition to ethylene and vinyl esters or acrylates are also suitable. The weight average molecular weight of these flow improvers is, as a rule, from 500 to 5000, preferably from 1000 to 3000.

The novel copolymers result in a substantial improvement in the low-temperature flow properties of middle distillates, regardless of their origin, by keeping the precipitated paraffin crystals effectively in suspension so that there are no blockages of filters or pipes by paraffin which has settled out. They have a broad activity and thus ensure that the precipitated paraffin crystals in various middle distillates are very well dispersed.

EXAMPLES

In the examples which follow, percentages are by weight.
1.1 Preparation of the MA/diketene copolymers A1 and A2
A1:

A solution of 69 g of maleic anhydride in 340 g of toluene was initially taken in a glass reactor provided with a stirrer and three feeds and flushed with nitrogen during the reaction, and was heated to 90° C. while stirring. As soon as the stated temperature was reached, 67 g of diketene were metered in over 3 hours. At the same time, a solution of 2.7 g of tert-butyl peroctoate in 50 g of toluene was metered in over 3.5 hours. 10 minutes after the end of the feed, a further 0.7 g of tert-butyl peroctoate was added in the course of 10 minutes. Thereafter, the temperature was increased from 90° to 100° C. and stirring was carried out for 2 hours. After cooling, the suspension was filtered under suction and the residue was dried. 108 g of colorless powder (80% of theory) were obtained. The copolymer had a K value of 17 (5% strength in $H_2O$]. The IR spectrum showed characteristic bands at 1840 $cm^{-1}$ (lactone) and 1780 $cm^{-1}$ (anhydride).
A2:

A solution of 13.8 g of maleic anhydride in 66 g of Solvesso® 150 was initially taken in a glass reactor provided with a stirrer and three feeds and flushed with nitrogen during the reaction. 13.4 g of diketene were added and the mixture was then heated to 70° C. while stirring. After this temperature had been reached, 15.4 g of a 1% strength solution of tert-butyl perpivalate in Solvesso® 150 were metered in over 4 hours. After the end of the feed, stirring was continued for a further 1.5 hours. The suspension thus obtained had a solids content of 12.4% and was directly reacted further without additional working up.
1.2 Preparation of the dialkyl fumarate/diketene copolymers A3 and A4
A3:

A solution of 41.3 g of diethyl fumarate in 27 g of o-xylene was initially taken in a glass reactor provided with a stirrer and three feeds and flushed with nitrogen during the reaction, and was heated to 90° C., and a solution of 20.2 g of diketene in 15.6 g of o-xylene was added dropwise at this temperature. At the same time, a solution of 3.1 g of tert-butyl peroctoate in 20 g of o-xylene was added in the course of 4 hours. After the end of the addition, stirring was continued for a further 2 hours at 95° C. The yellow solution thus obtained had a solids content of 50% and was further reacted without additional working up.
A4:

A solution of 49.4 g of didecyl fumarate in 32 g of o-xylene was initially taken in a glass reactor provided with a stirrer and three feeds and flushed with nitrogen during the reaction, and was heated to 90° C., and a solution of 16.8 g of diketene in 17 g of o-xylene was added dropwise at this temperature. At the same time, a solution of 1.7 g of tert-butyl peroctoate in 16 g of o-xylene was added in the course of 3.5 hours. After the end of the addition, stirring was continued for a further 2 hours at 95° C. The oily solution thus obtained had a solids content of 50% and was further reacted without additional working up.

1.3 Preparation of the MA/stearyldiketene copolymer A5
A5:

A solution of 53.2 g of distearyldiketene (Basoplast® 20 from BASF Aktiengesellschaft) and 9.8 g of MA in 15.8 g of Solvesso® 150 was initially taken in a glass reactor provided with a stirrer and three feeds and flushed with nitrogen during the reaction, and was heated to 90° C., and a solution of 3.15 g of tert-butyl peroctoate in g of Solvesso was added in the course of 3.5 hours at this temperature. After the end of the addition, stirring was continued for a further 2 hours at 95° C. The viscous solution thus obtained had a solids content of 67.2% and was further reacted without additional working up.
2. Reaction of the MA/diketene copolymers A1 and A2 with amines Example 1

MA/diketene monoamide 36.6 g of A1 and 101 g of distearylamine (Armeen® 2HT from Akzo) in 137 g of Solvesso® 150 were initially taken and were heated to 80° C. The mixture was stirred for 8 hours at this temperature. A highly viscous brown liquid having a solids content of 44% was obtained.

The weakening of the band at 1830 $m^{-1}$ (lactone having a 4-membered ring) and the formation of a band at 1650 $cm^{-1}$ (amide) were observed in the IR spectrum. The acid number of the product solution was 47 mg KOH/g.

Example 2

MA/diketene bisester 46 g of A1 and 250 g of hydroxyethylstearylamine in 400 g of Solvesso® 150 were initially taken and were heated to 80° C. After the addition of 1.5 g of p-toluenesulfonic acid, the mixture was heated to 160° C. and stirred at this temperature for 7.5 hours. A 50% strength brown solution of the product in Solvesso® 150 was obtained.

The weakening of the band at 1830 $cm^{-1}$ (lactone having a 4-membered ring) and the formation of a band at 1730 $cm^{-1}$ (ester) were observed in the IR spectrum. The acid number of the product solution was 6 mg KOH/g.

Example 3

Monoamide with oleylamine 27.5 g of A1 and 40.1 g of oleylamine in 110 g of Solvesso® 150 were initially taken and were heated to 80° C. The mixture was stirred at this temperature for 8 hours. A highly viscous brown liquid having a solids content of 43.5% was obtained.

The weakening of the band at 1830 $cm^{31\ 1}$ (lactone having a 4-membered ring) and the formation of a band at 1650 $cm^{-1}$ (amide) were observed in the IR spectrum. The acid number of the product solution was 53 mg KOH/g.

Example 4

Bisamide with N-tallow fat-1,3-diaminopropane 25.8 g of A1 and 92.5 g of N-tallow fat-1,3-diaminopropane in 200 g of Solvesso® 150 were initially taken. The mixture was heated to 160° C. and stirred at this temperature for 8 hours. A 37.3% strength brown solution of the product in Solvesso® 150 was obtained.

The weakening of the band at 1830 $cm^{-1}$ (lactone having a 4-membered ring) and the formation of a band at 1650 cm$^{-1}$ (amide) were observed in the IR spectrum. The acid number of the product solution was 7.2 mg KOH/g.

Example 5

Monoamide with isotridecylamine 25.8 g of A1 and 30 g of isotridecylamine in 80 g of Solvesso® 150 were initially taken and were heated to 80° C. The mixture was stirred at this temperature for 8 hours. A highly viscous brown liquid having a solids content of 46% was obtained.

The weakening of the band at 1830 cm–$^1$ (lactone having a 4-membered ring) and the formation of a band at 1650 cm$^{-1}$ (amide) were observed in the IR spectrum. The acid number of the product solution was 78 mg KOH/g.

Example 6

Monoester with propoxylated di-tallow fatty amine 18.3 g of A1 and 79.1 g of di-tallow fatty amine which had been propoxylated with in each case 5 molecules of propylene oxide, in 80 g of Solvesso® 150 were initially taken and were heated to 120° C. 1.9 g of 50% strength hypophosphorous acid were added as a catalyst. The mixture was stirred at this temperature for 8 hours. A highly viscous brown liquid having a solids content of 58% was obtained.

The weakening of the band at 1830 cm$^{-1}$ (lactone having a 4-membered ring) and the formation of a band at 1730 cm$^{-1}$ (ester) were observed in the IR spectrum. The acid number of the product solution was 57 mg KOH/g.

Example 7

Monoester with ethoxylated distearylamine 18.3 g of A1 and 63.9 g of distearylamine which had been ethoxylated with in each case 3 molecules of ethylene oxide, in 80 g of Solvesso® 150, were initially taken and were heated to 120° C. 0.8 g of 50% strength hypophosphorous acid were added as a catalyst. The mixture was stirred at this temperature for 8 hours. A highly viscous brown liquid having a solids content of 52.7% was obtained.

The weakening of the band at 1830 cm$^{-1}$ (lactone having a 4-membered ring) and the formation of a band at 1730 cm$^{-1}$ (ester) were observed in the IR spectrum. The acid number of the product solution was 42 mg KOH/g.

Example 8

Monoamide with aminopropylstearyl alcohol 25.8 g of A1 and 47.0 g of aminopropylstearyl alcohol in 1200 g of Solvesso® 150 were initially taken and were heated to 80° C. The mixture was stirred at this temperature for 8 hours. A highly viscous brown liquid having a solids content of 44.5% was obtained.

The weakening of the band at 1830 cm$^{-1}$ (lactone having a 4-membered ring) and the formation of a band at 1650 cm$^{-1}$ (amide) were observed in the IR spectrum. The acid number of the product solution was 54 mg KOH/g.

Example 9

Monoamide of fumaric bisester/diketene copolymer 50.5 g of A4 and 25.3 g of distearylamine were initially taken and were heated to 100° C. The mixture was stirred at this temperature for 12 hours. A highly viscous brown liquid having a solids content of 57% was obtained.

The weakening of the band at 1830 cm$^{-1}$ (lactone having a 4-membered ring) and the formation of a band at 1650 cm$^{-1}$ (amide) were observed in the IR spectrum. The acid number of the product solution was below 4 mg KOH/g.

Example 10

Monoamide of stearyldiketene/MA copolymer 28 g of A5 and 15.1 g of distearylamine were initially taken and were heated to 80° C. The mixture was stirred at this temperature for 15 hours. A highly viscous brown liquid having a solids content of 77.8% was obtained.

The weakening of the band at 1830 cm$^{-1}$ (lactone having a 4-membered ring) and the formation of a band at 1650 cm$^{-1}$ (amide) were observed in the IR spectrum. The acid number of the product solution was 53 mg KOH/g.

3. Examples of use

The novel copolymers B1, B2 and B7 and a known flow improver F1 based on an ethylene/vinyl propionate copolymer containing about 40% by weight of vinyl propionate and having a weight average molecular weight of 2500 were tested in a number of middle distillates. These were diesel fuels of commercial German refinery quality; they are referred to as DK 1, DK 2 and DK 3:

|  | DK 1 | DK 2 | DK 3 |
| --- | --- | --- | --- |
| Cloud point CP (°C.) | −8 | −7 | −7 |
| CFPP (°C.) | −10 |  | −14 |
| Density at 20° C. (g/ml) | 0.831 | 0.826 | 0.814 |
| Initial boiling point (°C.) | 175 | 172 | 164 |
| 20% boiling point (°C.) | 223 | 217 | 206 |
| 90% boiling point (°C.) | 314 | 321 | 306 |
| Final boiling point (°C.) | 352 | 356 | 337 |

3.1 Description of the test methods

The amounts, stated in the tables, of the novel copolymers B1, B2 and B7 and/or the known flow improver F1 were added to the stirred middle distillates at 40° C. and the mixture was then cooled to room temperature.

Test 1

The additive-containing middle distillates were stored in 100 ml measuring cylinders for 20 hours in a refrigerator at −13° C. Thereafter, the volume and appearance of both the paraffin phase which had settled out and the supernatant oil phase were visually determined and evaluated. In addition, the cold filter plugging point (CFPP) according to DIN EN 116 was measured for virtually every sample.

The results are shown in Table 1. It is evident that the novel copolymers B1 and B2 have excellent activity as paraffin dispersants. In contrast, the flow improver F1 has no dispersant activity.

Test 2

The additive-containing middle distillates were cooled from room temperature to −13° C. in 500 ml glass cylinders in a cold bath and stored at this temperature for 20 hours. Thereafter, the amount and appearance of the paraffin phase were visually determined and evaluated. The cold filter plugging point (CFPP) according to DIN EN 116 and the cloud point (CP) according to ASTM D 2500 were determined for each sample of the 20% by volume lower phase separated off at −13° C.

The results are shown in Table 2. In addition to the visual evaluation, the good agreement of the CP of the 20% by volume lower phase with the CP of the particular middle distillate shows that virtually complete dispersing of the n-paraffins was achieved.

TABLE 1

| Example | Middle distillate | B1/B2 content (ppm) | F1 content (ppm) | CFPP (°C.) | Paraffin phase | | Oil phase | |
|---|---|---|---|---|---|---|---|---|
| | | | | | (% by volume) | Appearance | (% by volume) | Appearance |
| Example 1 | DK1 | 200 (B1) | 200 | — | 100 | dispersed | 0 | — |
| Example 2 | DK1 | 200 (B2) | 200 | — | 100 | dispersed | 0 | — |
| Comp. Example 1 | DK1 | — | 300 | — | 30 | settled out | 70 | clear |
| Example 3 | DK2 | 200 (B1) | 300 | −26 | 100 | dispersed | 0 | — |
| Example 4 | DK2 | 200 (B2) | 300 | −29 | 88 | dispersed | 12 | clear |
| Example 5 | DK3 | 200 (B1) | 300 | −24 | 100 | dispersed | 0 | — |
| Example 6 | DK3 | 200 (B2) | 300 | −28 | 100 | dispersed | 0 | — |

TABLE 2

| Example | Middle distillate | B1/B7 content (ppm) | F1 content (ppm) | CFPP (°C.) | Paraffin phase | | 20% lower phase | |
|---|---|---|---|---|---|---|---|---|
| | | | | | (% by volume) | Appearance | CFPP (°C.) | CP (°C.) |
| Example 7 | DK1 | 300 (B1) | 300 | −29 | 100 | dispersed | −29 | −8 |
| Example 8 | DK1 | 300 (B7) | 300 | −27 | 100 | dispersed | −29 | −8 |
| Example 9 | DK2 | 300 (B1) | 300 | −31 | 100 | dispersed | −23 | −7 |

We claim:

1. A modified copolymer which is suitable as a paraffin dispersant and is obtained by reacting a copolymer of an ethylenically unsaturated dicarboxylic acid or a dicarboxylic acid derivative and a diketene of the formula I

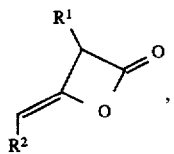

where $R^1$ and $R^2$, independently of one another, are each hydrogen or $C_1$–$C_{30}$-alkyl, the presence of a monoethylenically unsaturated $C_3$–$C_8$-monocarboxylic acid as a comonomer being excluded, with an amine of the formula II

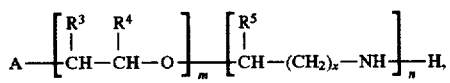

where m may be from 0 to 100, n from 0 to 5 and x from 0 to 5.

$R^3$, $R^4$ and $R^5$, independently of one another, are each hydrogen or $C_1$–$C_5$-alkyl and A is $NR^6R^7$ or $C_2$–$C_{30}$-alkoxy, and at least one of the substituents $R^6$ or $R^7$ is not hydrogen and is $C_1$–$C_{30}$-alkyl or alkenyl or a polyether radical $$\left[ \begin{matrix} R^8 & R^9 \\ | & | \\ -CH-CH-O- \end{matrix} \right]_p H$$

where $R^8$ and $R^9$ are each hydrogen or $C_1$–$C_5$-alkyl and p is from 1 to 100, with the proviso that, when n is 0, A is $NR^6R^7$.

2. A copolymer as claimed in claim 1, wherein n or m is 0.

3. A copolymer as claimed in claim 1, wherein an ethylenically unsaturated dicarboxylic acid or dicarboxylic acid derivative of the formula III

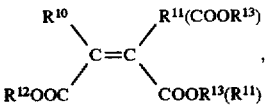

where $R^{10}$ to $R^{13}$, independently of one another, are each hydrogen or a $C_1$–$C_{20}$—alkyl radical which may contain hetero atoms, or an anhydride of a corresponding cis-dicarboxylic acid is used.

4. A copolymer as claimed in claim 3, wherein $R^{10}$ and $R^{11}$ are each hydrogen.

5. A mineral oil middle distillate containing a copolymer as claimed in claim 1.

6. A process for the preparation of a modified copolymer which is suitable as a paraffin dispersant by reacting a copolymer of an ethylenically unsaturated dicarboxylic acid or a dicarboxylic acid derivative and a diketene of the formula I

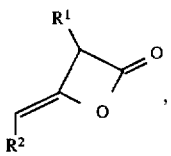

where $R^1$ and $R^2$, independently of one another, are each hydrogen or $C_1-C_{30}$-alkyl, the presence of a monoethylenically unsaturated $C_3-C_8$—monocarboxylic acid as a comonomer being excluded, with an amine of the formula II

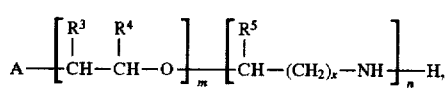

where m may be from 0 to 100, n from 0 to 5 and x from 0 to 5, $R^3$, $R^4$ and $R^5$, independently of one another, are each hydrogen or $C_1-C_5$-alkyl and A is $NR^6R^7$ or $C_2-C_{30}$-alkoxy, and at least one of the substituents $R^6$ or $R^7$ is not hydrogen and is $C_1-C_{30}$-alkyl or alkenyl or a polyether radical

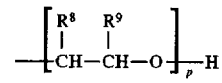

where $R^8$ and $R^9$ are each hydrogen or $C_1-C_5$-alkyl and p is from 1 to 100, with the proviso that, when n is 0, A is $NR^6R^7$.

* * * * *